US011270410B2

(12) United States Patent
Suzuki et al.

(10) Patent No.: US 11,270,410 B2
(45) Date of Patent: Mar. 8, 2022

(54) VIDEO DISPLAY SYSTEM

(71) Applicant: Sony Interactive Entertainment Inc., Tokyo (JP)

(72) Inventors: Akira Suzuki, Tokyo (JP); Akihiko Sugawara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/992,208

(22) Filed: Aug. 13, 2020

(65) Prior Publication Data

US 2020/0372607 A1 Nov. 26, 2020

Related U.S. Application Data

(63) Continuation of application No. 16/060,999, filed as application No. PCT/JP2017/004065 on Feb. 3, 2017, now Pat. No. 10,810,701.

(30) Foreign Application Priority Data

Feb. 9, 2016 (JP) ................................. 2016-022622

(51) Int. Cl.
*G06T 3/40* (2006.01)
*G09G 5/36* (2006.01)
(Continued)

(52) U.S. Cl.
CPC ............ *G06T 3/40* (2013.01); *G02B 27/0172* (2013.01); *G02B 27/02* (2013.01); *G06T 7/11* (2017.01);
(Continued)

(58) Field of Classification Search
CPC ................ G06T 3/40; G06T 7/11; H04N 7/18
See application file for complete search history.

(56) References Cited

U.S. PATENT DOCUMENTS 5,320,534 A 6/1994 Thomas
6,417,867 B1 7/2002 Hallberg
(Continued)

FOREIGN PATENT DOCUMENTS

JP 09233471 A 9/1997
JP 2003333593 A 11/2003
(Continued)

OTHER PUBLICATIONS

Machine translation of Hasegawa (WO 2015015584 A1), accessed Aug. 2021, pp. 1-8 (Year: 2021).*

(Continued)

*Primary Examiner* — Edward Park
(74) *Attorney, Agent, or Firm* — Matthew B. Dernier, Esq.

(57) ABSTRACT

A video display system that includes a display device and an image processing device. The display device is mounted on the head of a user for use. The image processing device generates a plurality of unsynthesized images having different resolutions that are to be used for display by the display device, and transmits the generated unsynthesized images to the display device. The display device receives the unsynthesized images transmitted from the image processing device, and displays a display image that is obtained by synthesizing the unsynthesized images.

7 Claims, 8 Drawing Sheets

(51) Int. Cl.

| | |
|---|---|
| *G02B 27/02* | (2006.01) |
| *G09G 5/377* | (2006.01) |
| *H04N 7/18* | (2006.01) |
| *H04N 21/234* | (2011.01) |
| *H04N 21/2662* | (2011.01) |
| *G09G 5/00* | (2006.01) |
| *G06T 7/11* | (2017.01) |
| *G02B 27/01* | (2006.01) |

(52) U.S. Cl.
CPC ............... *G09G 5/00* (2013.01); *G09G 5/36* (2013.01); *G09G 5/377* (2013.01); *H04N 7/18* (2013.01); *H04N 21/234* (2013.01); *H04N 21/2662* (2013.01); *G02B 2027/0138* (2013.01); *G02B 2027/0147* (2013.01); *G06T 2207/10016* (2013.01)

(56) References Cited

U.S. PATENT DOCUMENTS

| | | | |
|---|---|---|---|
| 8,217,988 | B2 | 7/2012 | Park |
| 8,493,390 | B2 | 7/2013 | Ozlem |
| 9,787,729 | B2 | 10/2017 | Horiuchi |
| 10,514,541 | B2 | 12/2019 | Tantos |
| 2002/0167461 | A1 | 11/2002 | Bronson |
| 2004/0227703 | A1* | 11/2004 | Lamvik ............... G09G 3/3233 345/76 |
| 2006/0034368 | A1 | 2/2006 | Klivington |
| 2009/0164567 | A1* | 6/2009 | Hara ...................... G06F 16/00 709/203 |
| 2012/0146891 | A1 | 6/2012 | Kalinli |
| 2012/0319928 | A1 | 12/2012 | Rhodes |
| 2013/0294506 | A1 | 11/2013 | Kang |
| 2014/0184475 | A1 | 7/2014 | Tantos |
| 2014/0247277 | A1 | 9/2014 | Guenter |
| 2014/0307802 | A1 | 10/2014 | Wang |
| 2015/0054913 | A1 | 2/2015 | Annau |
| 2015/0116203 | A1 | 4/2015 | Narita |
| 2015/0381665 | A1 | 12/2015 | Horiuchi |
| 2017/0366585 | A1 | 12/2017 | Horiuchi |
| 2018/0365800 | A1 | 12/2018 | Suzuki |

FOREIGN PATENT DOCUMENTS

| | | | |
|---|---|---|---|
| JP | 2004056335 | A | 2/2004 |
| JP | 2006054830 | A | 2/2006 |
| JP | 2007174568 | * | 7/2007 |
| JP | 2007174568 | A | 7/2007 |
| JP | 2007235314 | A | 9/2007 |
| JP | 2007274621 | A | 10/2007 |
| JP | 2013254358 | A | 12/2013 |
| JP | 2014508311 | A | 4/2014 |
| JP | 2014146871 | A | 8/2014 |
| JP | 2016012843 | A | 1/2016 |
| JP | 2016510525 | A | 4/2016 |
| KR | 100739686 | B1 | 7/2007 |
| KR | 100751290 | B1 | 8/2007 |
| WO | 2014168972 | A1 | 10/2014 |
| WO | 2015015584 | A1 | 2/2015 |
| WO | WO 2015015584 | A1 * | 2/2015 |
| WO | 2017138458 | A1 | 8/2017 |

OTHER PUBLICATIONS

Machine translation of Okada et al (JP 2007174568), accessed Aug. 2021, pp. 1-18 (Year: 2021).*
Notice of Reason for refusal for corresponding JP Application No. 2019-135407, 8 pages, dated Jan. 26, 2021.
Notice of Reason for refusal for corresponding JP Application No. 2019-135407, 8 pages, dated Nov. 10, 2020.
Office Action for corresponding JP Application No. 2019-135407, 10 pages, dated Aug. 24, 2020.
International Search Report for corresponding PCT Application No. PCT/JP2017/004065, 4 pages, dated Mar. 7, 2017.
International Preliminary Report on Patentability and Written Opinion for corresponding PCT Application No. PCT/JP2017/004065, 18 pages, dated Aug. 23, 2018.
Office Action for corresponding JP Application No. 2017-566919, 12 pages, dated Feb. 19, 2019.
Office Action for corresponding KR Application No. 10-2019-7022916, 7 pages, dated Jun. 25, 2019.
Extended European Search Report for corresponding EP Application No. 17750181.4, 9 pages, dated Aug. 19, 2019.
Office Action for corresponding KR Application No. 10-2018-7022916, 5 pages, dated Nov. 12, 2019.
Office Action for corresponding CN Application No. 201780009524. 9, 12 pages, dated Mar. 27, 2020.

* cited by examiner

F I G . 6

| LEADING COORDINATES | SIZE | MAGNIFICATION RATIO | IMAGE PROCESSING PARAMETERS | IMAGE DATA ROWS |
|---|---|---|---|---|
| (X3, Y3) | (W3, H3) | 4X | Pm1, Pm2, … | IMAGE DATA ON OVERALL IMAGE P0 |
| (X2, Y2) | (W2, H2) | 2X | Pm3, Pm4, … | IMAGE DATA ON FIRST PARTIAL IMAGE P1 |
| (X1, Y1) | (W1, H1) | 1X | Pm5, Pm6, … | IMAGE DATA ON SECOND PARTIAL IMAGE P2 |

VIDEO DISPLAY SYSTEM

CROSS REFERENCE TO RELATED APPLICATIONS

This is a continuation application of U.S. patent application Ser. No. 16/060,999, accorded a filing date of Jun. 11, 2018, which is a national phase application of International Application No. PCT/JP2017/004065, filed Feb. 3, 2017, which claims priority to Japanese Application No. JP 2016-022622, filed Feb. 9, 2016, the entire disclosures of which are hereby incorporated by reference.

TECHNICAL FIELD

The present invention relates to a video display system that displays video on a display device mounted on the head of a user for use, an image processing device and a display device included in the video display system, an image processing method, and a program.

BACKGROUND ART

A known technology called "Foveated Rendering" renders a region of interest (a region estimated to be gazed by the user) within an image at a higher resolution than the outside of the region of interest. This technology makes it possible to generate an image by rendering the region of interest at a high resolution with a lower processing load than when the image is entirely rendered at the high resolution.

SUMMARY

Technical Problems

When the above technology is used, the image eventually displayed on a display device needs to be entirely at a high resolution in accordance with the resolution of the region of interest. Further, it is desirable that a display device mounted on the head of the user for use, such as a head-mounted display, display video at a relatively high frame rate. In order to display video at a high resolution and at a high frame rate as mentioned above, an image processing device for generating a display image needs to transmit image data to the display device at a high data transmission rate.

The present invention has been made in view of the above circumstances. An object of the present invention is to provide a video display system, an image processing device, a display device, an image processing method, and a program that are capable of relatively reducing a data transmission amount when the display device displays an image indicating a high-resolution region of interest.

Solution to Problems

A video display system according to the present invention includes a display device mounted on the head of a user for use and an image processing device for supplying video to be displayed on the display device. The image processing device includes an image generation section and a transmission section. The image generation section generates a plurality of unsynthesized images having different resolutions that are to be used for display by the display device. The transmission section transmits each of the unsynthesized images to the display device. The display device includes a reception section and a display control section. The reception section receives the unsynthesized images transmitted from the image processing device. The display control section displays a display image that is obtained by synthesizing the unsynthesized images.

An image processing device according to the present invention supplies video to a display device mounted on the head of a user for use. The image processing device includes an image generation section and a transmission section. The image generation section generates a plurality of unsynthesized images having different resolutions that are to be synthesized to obtain a display image to be displayed on the display device. The transmission section transmits each of the unsynthesized images to the display device.

A display device according to the present invention is mounted on the head of a user for use and connected to an image processing device that supplies video to the display device. The display device includes a reception section and a display control section. The reception section receives a plurality of unsynthesized images that are transmitted from the image processing device and different in resolution. The display control section displays a display image that is obtained by synthesizing the unsynthesized images.

An image processing method according to the present invention is used for supplying video to a display device mounted on the head of a user for use. The image processing method includes: a step of generating a plurality of unsynthesized images having different resolutions that are to be synthesized to obtain a display image to be displayed on the display device; and a step of transmitting each of the unsynthesized images to the display device.

A program according to the present invention controls an image processing device that supplies video to a display device mounted on the head of a user for use. The program causes the image processing device to function as an image generation section and as a transmission section. The image generation section generates a plurality of unsynthesized images having different resolutions that are to be synthesized to obtain a display image to be displayed on the display device. The transmission section transmits each of the unsynthesized images to the display device. The program may be provided by being stored in a computer-readable, non-transitory information storage medium.

BRIEF DESCRIPTION OF DRAWINGS

FIG. 6 is a diagram illustrating the contents of data that is transmitted from an image processing device to a display device.

DESCRIPTION OF EMBODIMENT

An embodiment of the present invention will now be described with reference to the accompanying drawings.

Figure 1:
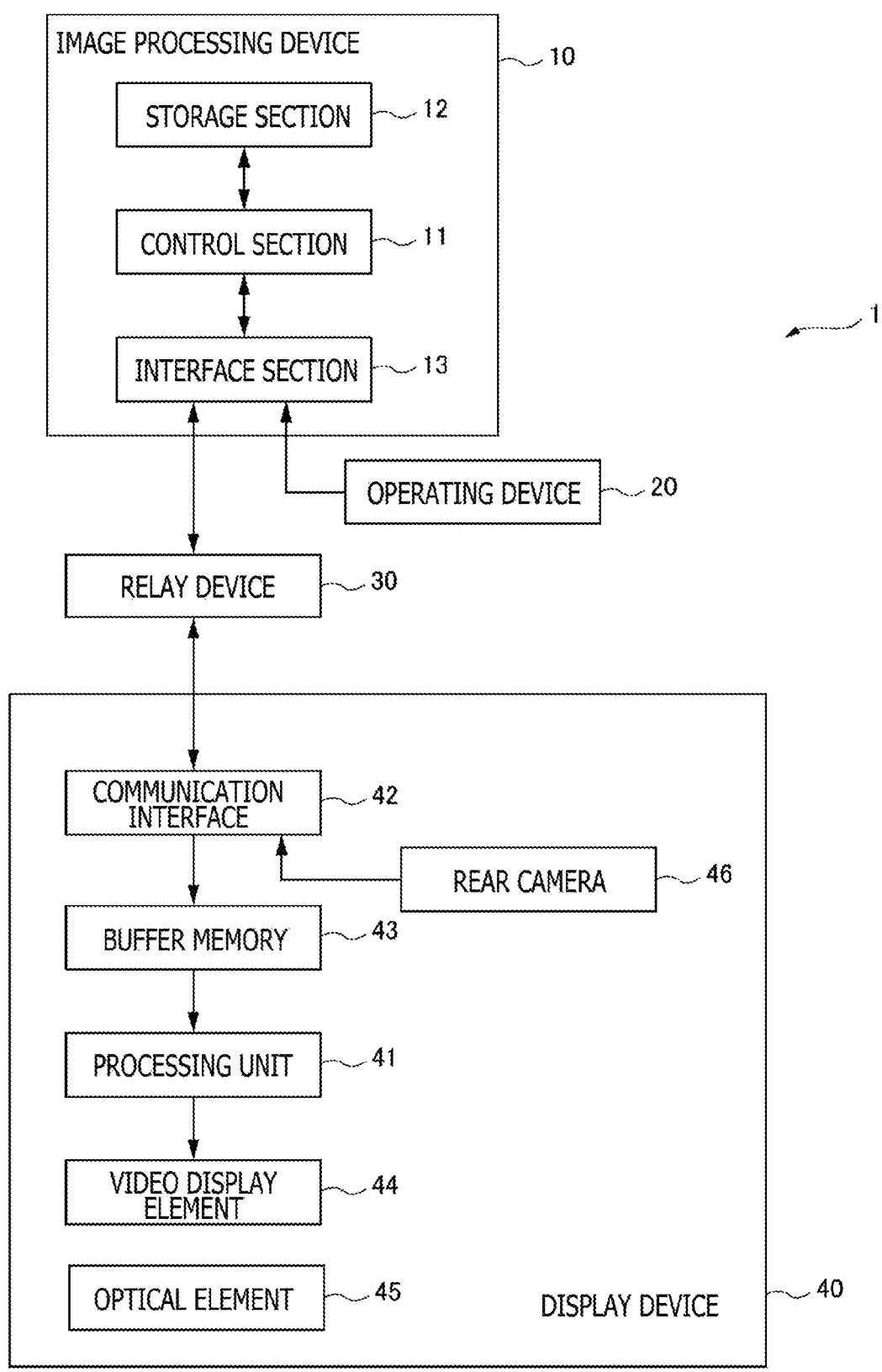
FIG. 1 is a block diagram illustrating an overall configuration of a video display system according to an embodiment of the present invention.

FIG. 1 is a block diagram illustrating a configuration of a video display system 1 according to an embodiment of the present invention. As illustrated in FIG. 1, the video display system 1 includes an image processing device 10, an operating device 20, a relay device 30, and a display device 40.

The image processing device 10 generates and supplies an image that is to be displayed by the display device 40. The image processing device 10 may be, for example, a home-use game machine, a portable game machine, a personal computer, a smartphone, or a tablet. As illustrated in FIG. 1, the image processing device 10 includes a control section 11, a storage section 12, and an interface section 13.

The control section 11 includes at least one processor, such as a central processing unit (CPU), and executes a program stored in the storage section 12 to perform various information processes. Concrete examples of the processes performed by the control section 11 in the present embodiment will be described later. The storage section 12 includes at least one memory device, such as a random access memory (RAM), and stores the program to be executed by the control section 11 and data to be processed by the program.

The interface section 13 is an interface for data communication between the operating device 20 and the relay device 30. The image processing device 10 is wire-connected or wirelessly connected to the operating device 20 and the relay device 30 through the interface section 13. More specifically, the interface section 13 may include a high-definition multimedia interface (HDMI) (registered trademark) or other multimedia interface in order to transmit video and audio supplied from the image processing device 10 to the relay device 30. Further, the interface section 13 includes a Bluetooth (registered trademark), universal serial bus (USB), or other data communication interface. Through the data communication interface, the image processing device 10 receives various information from the display device 40 via the relay device 30 and transmits, for example, a control signal. Further, the image processing device 10 receives an operation signal transmitted from the operating device 20 through the data communication interface.

The operating device 20 is, for example, a controller or keyboard for a home-use game machine, and receives an operation input from a user. The operating device 20 transmits to the image processing device 10 a signal indicative of the contents of the operation input received from the user.

The relay device 30 is connected to the display device 40. The relay device 30 receives image data supplied from the image processing device 10, and transmits the received image data to the display device 40. In this instance, the relay device 30 may perform, for example, a correction process on the supplied image data as needed to cancel distortion caused by an optical system of the display device 40, and output the corrected image data. Further, in addition to the image data, the relay device 30 relays audio data, control signals, and various other information exchanged between the image processing device 10 and the display device 40. The present embodiment assumes that the relay device 30 wirelessly transmits and receives data to and from the display device 40.

The display device 40 displays video based on the image data received from the relay device 30 in order to permit the user to view the displayed video. The present embodiment assumes that the display device 40 is mounted on the head of the user for use and adapted to permit both eyes to view the video. That is to say, the display device 40 forms a video image in front of each of the right and left eyes of the user. The display device 40 may be configured so as to be able to display a three-dimensional video image based on binocular parallax. As illustrated in FIG. 1, the display device 40 includes a processing unit 41, a communication interface 42, a buffer memory 43, a video display element 44, an optical element 45, and a rear camera 46.

The processing unit 41 includes, for example, an integrated circuit, generates a frame image (display image) on the basis of the image data that is received from the image processing device 10 through the relay device 30, and supplies the generated frame image to the video display element 44. By repeating this process at a predetermined frame rate, the processing unit 41 causes the video display element 44 to display video.

The communication interface 42 is used to establish data communication with the relay device 30. The communication interface 42 includes, for example, an antenna and communication circuit for wireless communication. The image data received from the relay device 30 by the communication interface 42 is temporarily stored in the buffer memory 43. The processing unit 41 generates a frame image on the basis of the image data stored in the buffer memory 43.

The video display element 44 is, for example, an organic electroluminescence (EL) display panel or a liquid-crystal display panel, and displays video based on a video signal supplied from the processing unit 41. The video display element 44 displays two video images, namely, a left-eye video image and a right-eye video image. The video display element 44 may be a single display element for displaying the left- and right-eye video images side by side or two display elements for displaying video images on an independent basis. Further, for example, a well-known smartphone may be used as the video display element 44. Furthermore, the display device 40 may be a retinal irradiation (retinal projection) display device that projects a video image directly to the retinas of the user. In this case, the video display element 44 may include, for example, a laser that emits light and a micro electro mechanical systems (MEMS) mirror that scans the emitted light.

The optical element 45 is, for example, a holographic optical element, a prism, or a half mirror. Disposed in front of the eyes of the user, the optical element 45 transmits or refracts video light emitted from the video display element 44 and causes the video light to become incident on the left and right eyes of the user. More specifically, the left-eye video image displayed by the video display element 44 becomes incident on the left eye of the user through the optical element 45, and the right-eye video image becomes incident on the right eye of the user through the optical element 45. With the display device 40 mounted on the user's head, the user is then able to view the left-eye video image with the left eye and view the right-eye video image with the right eye.

The rear camera 46 is disposed so as to be able to capture an image of a rear view from the display device 40 (that is, capture an image of the user), and is used to capture an image of each of the left and right eyes of the user. The image captured by the rear camera 46 is transmitted to the image processing device 10 through the relay device 30.

Figure 2:
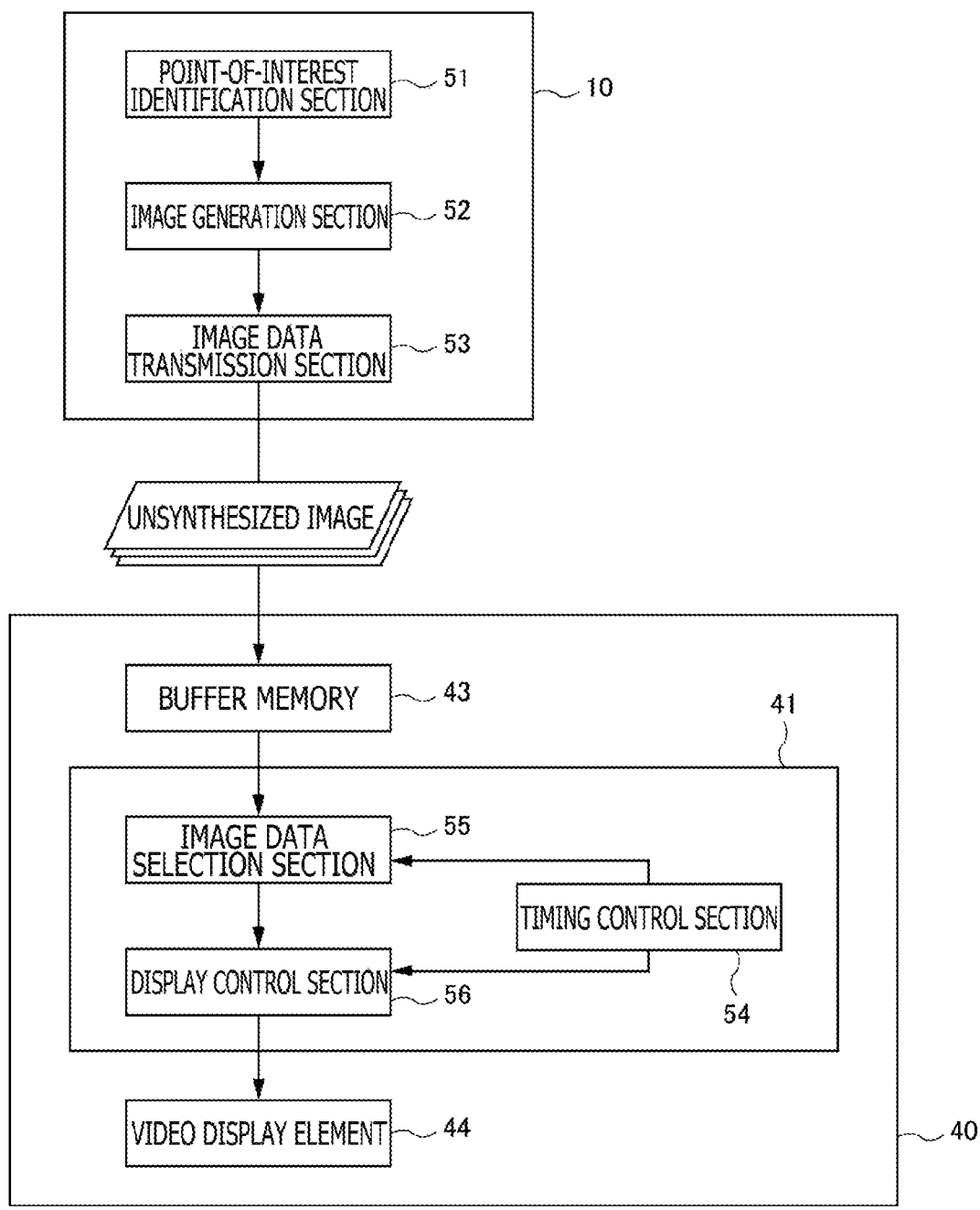
FIG. 2 is a functional block diagram illustrating functions implemented by the video display system according to the embodiment of the present invention.

Functions implemented by the video display system 1 will now be described with reference to FIG. 2. As illustrated in FIG. 2, the image processing device 10 functionally includes a point-of-interest identification section 51, an image generation section 52, and an image data transmission section 53. These functions are implemented when the control section 11 executes a program stored in the storage section 12. The program may be provided to the image processing device 10 through a communication network such as the Internet or provided by being stored in a computer-readable information storage medium such as an optical disk. Meanwhile, the processing unit 41 in the display device 40 functionally includes a timing control section 54, an image data selection section 55, and a display control section 56. Some or all of these functions may be implemented by software or implemented by hardware such as an electronic circuit.

The point-of-interest identification section 51 identifies a position (a point of interest) within a display region that is gazed by a user using the display device 40. More specifically, the point-of-interest identification section 51 acquires an image captured by the rear camera 46 from the display device 40, and analyzes the acquired captured image to identify the gaze direction of the user. The point of interest is a position within the display region that corresponds to the gaze direction.

The image generation section 52 generates an image that is to be displayed on the display device 40. As a concrete example, it is assumed here that the image drawn by the image generation section 52 depicts a three-dimensional virtual space where various objects are disposed. However, the image generation section 52 is not limited to the above-described type, and may draw various other images. Further, it is assumed for the sake of simplicity that the display device 40 displays the same frame image as a left-eye image and a right-eye image. However, the video display system 1 according to the present embodiment may display different frame images as the left- and right-eye images to achieve three-dimensional display based on parallax. In such a case, the image processing device 10 and the display device 40 should parallelly perform the following described process for each of left and right frame images.

In the present embodiment, the image generation section 52 generates a plurality of images having different resolutions for one frame image to be displayed on the display device 40. These images draw the same target at different resolutions in such a manner that the higher the resolution, the smaller the drawn region. As described later, these images are synthesized into one frame image in the display device 40 and displayed by the video display element 44. The images generated by the image generation section 52 and eventually synthesized into one frame image are hereinafter referred to as the unsynthesized images. Further, as a concrete example, it is hereinafter assumed that the image generation section 52 generates three different unsynthesized images. In order from the lowest resolution to the highest, the three different unsynthesized images are an overall image P0, a first partial image P1, and a second partial image P2.

Figure 3:
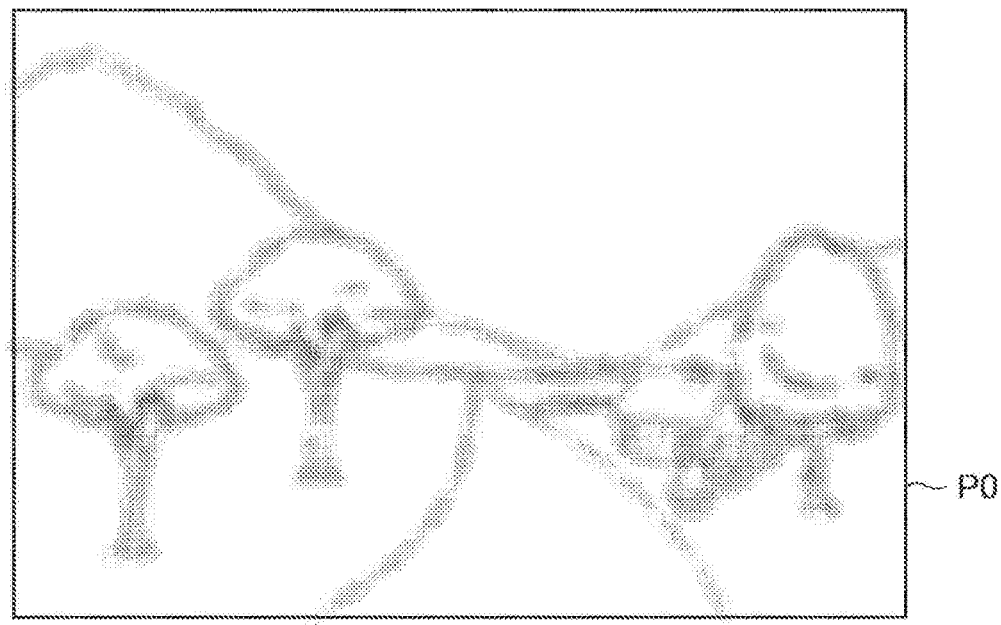
FIG. 3 is a diagram illustrating an example of an overall image P0.
Figure 4:
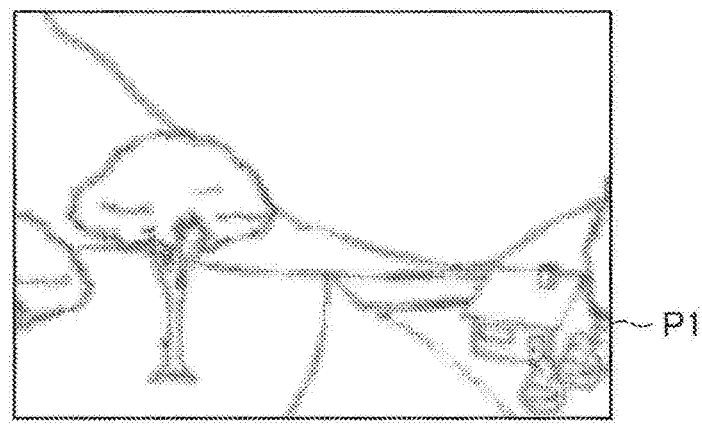
FIG. 4 is a diagram illustrating an example of a first partial image P1.
Figure 5:
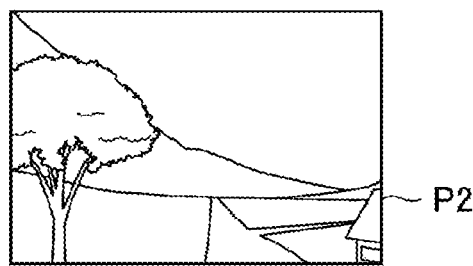
FIG. 5 is a diagram illustrating an example of a second partial image P2.

FIGS. 3, 4 and 5 are diagrams illustrating examples of the three different unsynthesized images. As illustrated in FIG. 3, the overall image P0 is displayed on the assumption that it is displayed in the whole display region of the display device 40 at a lower resolution than the first partial image P1 and the second partial image P2. Meanwhile, as illustrated in FIG. 4, the first partial image P1 is obtained by drawing a partial region within the overall image P0 at a higher resolution than the overall image P0. The second partial image P2, which is illustrated in FIG. 5, is obtained by drawing a partial region smaller than the first partial image P1 at an even higher resolution than the first partial image P1. It is assumed that the second partial image P2 is displayed at the same resolution as a frame image actually displayed on the display device 40.

Regions to be drawn as the first partial image P1 and the second partial image P2 are determined on the basis of the point of interest identified by the point-of-interest identification section 51. More specifically, the partial images are obtained by drawing regions centered around the point of interest within the overall image P0. If, for example, the user wearing the display device 40 gazes a point that is upper right of the center of the display region, the first partial image P1 and the second partial image P2 are obtained by drawing an upper right region within the overall image P0. FIGS. 4 and 5 illustrate a case where the point of interest is at the center of the overall image P0, and each of the partial images corresponds to the central region of the overall image P0.

As described above, the unsynthesized images drawn by the image generation section 52 are such that the larger the target region, the lower the resolution. Therefore, the total amount of data in the overall image P0, the first partial image P1, and the second partial image P2 is smaller than the amount of data in an eventually displayed frame image (i.e., an image obtained by drawing the whole region covered by the overall image P0 at the same resolution as the second partial image P2).

The image data transmission section 53 transmits unsynthesized image data generated by the image generation section 52 to the relay device 30. In this instance, the image data transmission section 53 individually transmits the overall image P0, the first partial image P1, and the second partial image P2 while they are unsynthesized. This ensures that the amount of data to be transmitted from the image processing device 10 to the display device 40 in order to display one frame image is smaller than when a high-resolution, synthesized frame image is transmitted.

In the present embodiment, instead of the image processing device 10, which generates the unsynthesized images, the display device 40 synthesizes the unsynthesized images to generate a frame image to be actually displayed. Therefore, it is assumed that the image data transmission section 53 transmits additional information together with the unsynthesized image data. The additional information includes various items of information indicating how the display device 40 should synthesize the unsynthesized images.

More specifically, before transmitting the unsynthesized images, the image data transmission section 53 attaches to each of the unsynthesized images the additional information indicative of the position of an unsynthesized image within a frame image, the size of the unsynthesized image within the frame image, the ratio of magnification, and other parameters necessary for processing the unsynthesized image. FIG. 6 is a schematic diagram illustrating the contents of data transmitted from the image data transmission section 53. FIG. 6 illustrates the above-described additional information attached to the unsynthesized images. Leading coordinates in FIG. 6 are examples of additional information indicative of the position of an unsynthesized image within a frame image. The leading coordinates represent position coordinates of an upper left pixel of an unsynthesized image within a frame image.

Image data transmitted from the image data transmission section 53 is inputted to the display device 40 through the relay device 30. The communication interface 42 of the display device 40 receives unsynthesized image data from the relay device 30 and temporarily stores the received unsynthesized image data in the buffer memory 43. The buffer memory 43 stores the unsynthesized image data received by the communication interface 42 on an as-is basis. Therefore, the buffer memory 43 does not need to have an adequate capacity for storing the whole of one frame image displayed by the video display element 44.

The timing control section 54 supplies a synchronization signal for controlling the timing of frame image display to the image data selection section 55 and to the display control section 56. The image data selection section 55 and the display control section 56 operate with timing derived from the synchronization signal supplied from the timing control section 54, and thus perform processing in synchronism with each other.

The image data selection section 55 and the display control section 56 cooperate to perform a process of synthesizing the unsynthesized images received from the image processing device 10 and generating a frame image to be displayed. More specifically, the image data selection section 55 determines an unsynthesized image to be used to determine the pixel value of each pixel in the frame image. Basically, the image data selection section 55 selects the highest-resolution unsynthesized image from among the unsynthesized images covering a pixel position of interest, and uses the selected highest-resolution unsynthesized image. For example, for pixels within a region corresponding to the second partial image P2 at the center of the frame image, the second partial image P2 is selected and used. Conversely, for a peripheral region of the frame image that is not covered by the first partial image P1 and the second partial image P2, the overall image P0 is selected and used. The image data selection section 55 makes the above-described selections by referencing the position and size information included in the additional information that is transmitted together with the unsynthesized images by the image data transmission section 53. Then, for each pixel in the frame image, the image data selection section 55 reads from the buffer memory 43 the pixel value information on a corresponding pixel in the selected unsynthesized image, and outputs the read pixel value information to the display control section 56.

On the basis of image data on the unsynthesized image selected by the image data selection section 55, the display control section 56 determines the pixel value of each pixel in the frame image. Then, the display control section 56 supplies to the video display element 44 a video signal for displaying the frame image including determined pixel values. Consequently, the video display element 44 is able to display the frame image that is obtained by synthesizing the unsynthesized images. Before synthesizing the unsynthesized images, the display control section 56 magnifies low-resolution unsynthesized images. The magnification ratio for such magnification is determined by a magnification ratio parameter in the additional information illustrated, for example, in FIG. 6.

When synthesizing the different unsynthesized images, the display control section 56 may perform image processing, for example, in such a manner as to blur and make indistinct the boundaries between the different unsynthesized images. When such image processing is to be performed, the details of image processing may be determined by using parameters included in the additional information transmitted from the image data transmission section 53.

Figure 7:
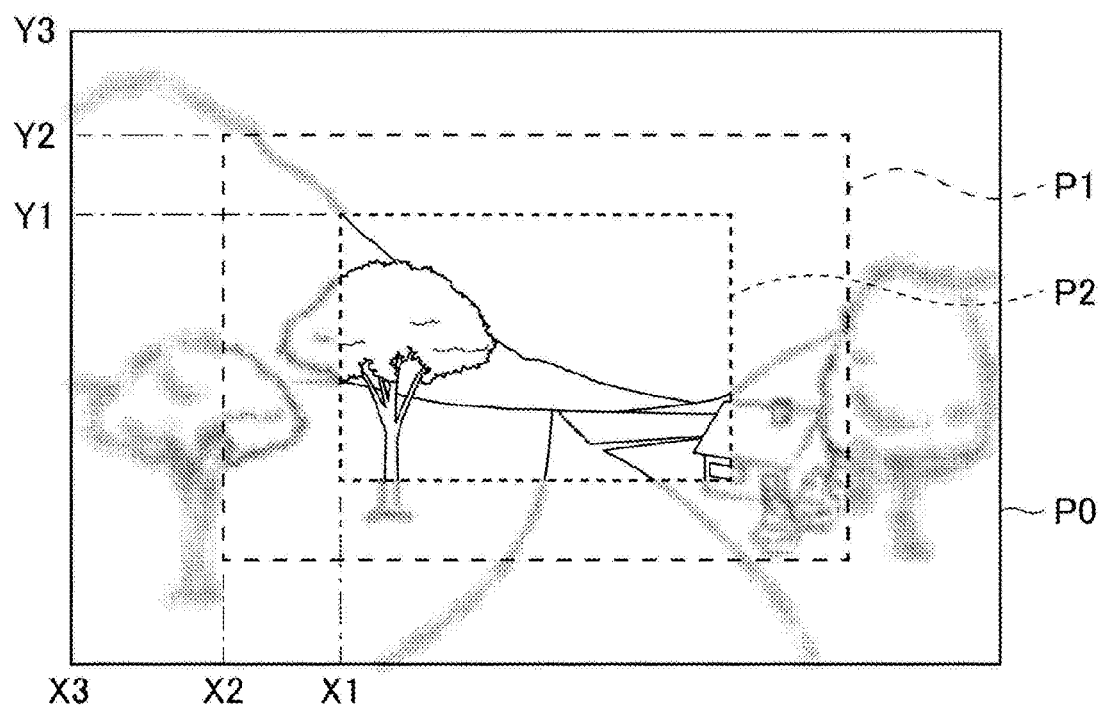
FIG. 7 is a diagram illustrating an example of a frame image to be displayed on the display device.

FIG. 7 illustrates an example of a frame image that is obtained by synthesizing three different unsynthesized images exemplified in FIGS. 3 to 5. This frame image has the same resolution as the second partial image P2 as a whole; however, a peripheral portion of the image is obtained by magnifying the low-resolution overall image P0. Meanwhile, a region estimated to be gazed by the user is generated on the basis of the high-resolution second partial image P2. Therefore, the user feels that the frame image is displayed at a high resolution.

Figure 8:
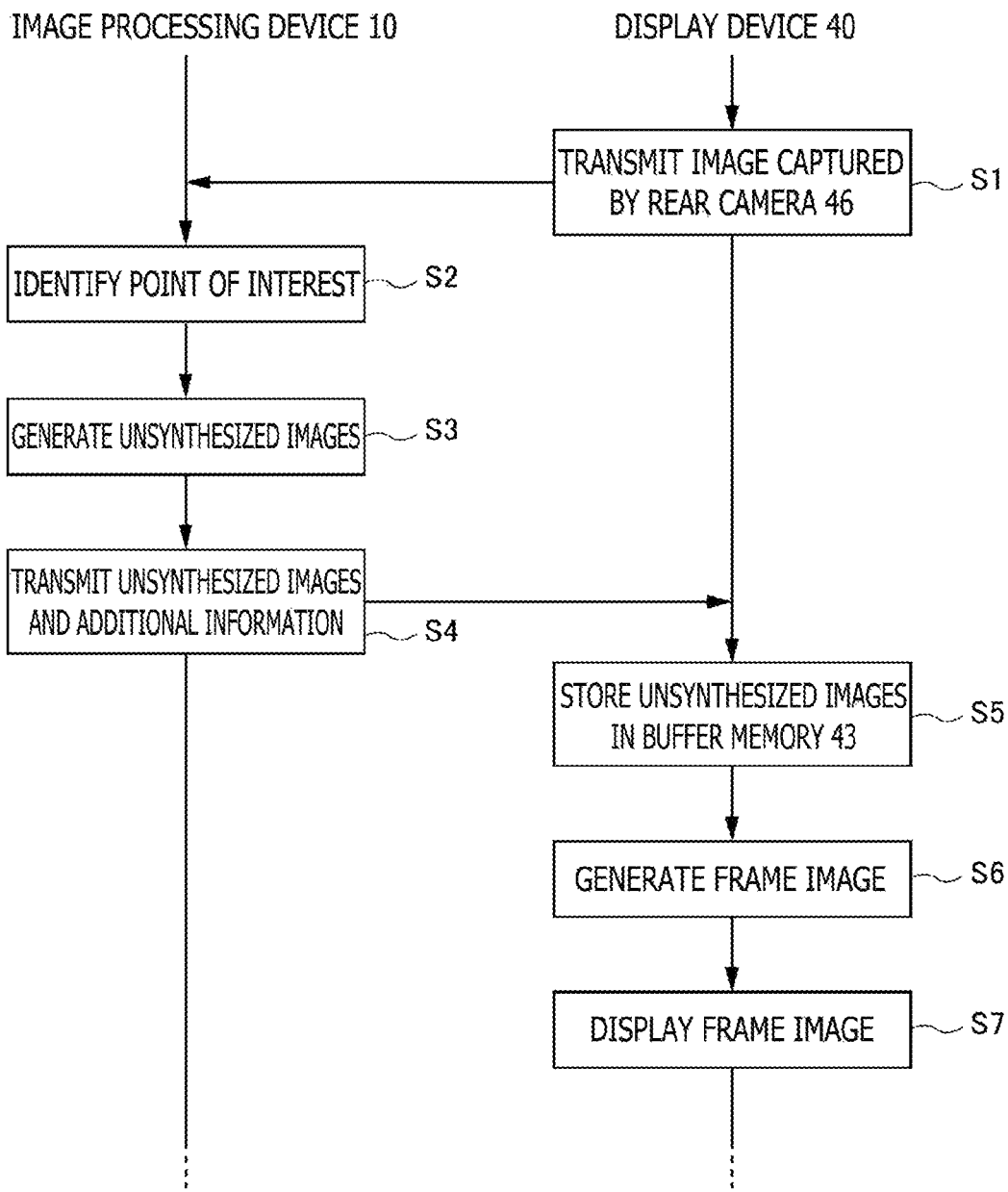
FIG. 8 is a sequence diagram illustrating an example of a flow of a process performed by the video display system.

A flow of a process performed by the video display system 1 to display one frame image will now be described with reference to the flowchart of FIG. 8.

First of all, the display device 40 transmits an image captured by the rear camera 46 to the image processing device 10 (step S1). The point-of-interest identification section 51 in the image processing device 10 then identifies the point of interest of the user by using the captured image transmitted in step S1 (step S2).

Next, the image generation section 52 generates three different unsynthesized images by using the information on the point of interest identified in step S2 (step S3). Subsequently, the image data transmission section 53 adds the additional information to the generated three different unsynthesized images and transmits the resulting combination of images and additional information to the display device 40 (step S4).

The communication interface 42 of the display device 40 stores in the buffer memory 43 image data on the unsynthesized images transmitted in step S4 (step S5). The processing unit 41 then generates a frame image by synthesizing the three different unsynthesized images stored in the buffer memory 43 in step S5 (step S6), and causes the video display element 44 to display the generated frame image (step S7).

The video display system 1 displays video by repeatedly performing the above-described process to update the frame image. The flowchart assumes that each time the frame image is updated, the image captured by the rear camera 46 is transmitted from the display device 40 to the image processing device 10 to update the point of interest. However, the point-of-interest identification section 51 may alternatively update the point of interest at longer time intervals. In such an alternative case, the image captured by the rear camera 46 need not be transmitted each time the frame image is updated. Thus, steps S1 and S2 are performed less frequently.

As described above, the video display system 1 according to the present embodiment is configured so that the image processing device 10 transmits a plurality of different unsynthesized images having different resolutions to let the display device 40 synthesize the unsynthesized images to obtain and display a frame image. Consequently, the amount of data to be transmitted to display one frame image can be reduced as compared with a case where a synthesized frame image is transmitted from the image processing device 10 to the display device 40. As a result, the display device 40 is able to display video indicating a high-resolution region of interest at a relatively high frame rate even if a great communication bandwidth is not provided between the image processing device 10 and the display device 40.

The foregoing description assumes that the first partial image P1 and the second partial image P2 are rectangular images having the same shape as the overall image P0 but different sizes from the overall image P0. However, the partial images are not limited to such a shape, and may have a square shape, a circular shape, or other shape different from that of the whole display region. Further, the image processing device 10 may select a partial image shape from among a plurality of candidates. In such an instance, the additional information includes information that specifies the partial image shape. The display device 40 references such additional information to identify what region of the frame image corresponds to a received partial image. Meanwhile, the overall image P0, too, is not limited to a rectangular shape, and may have a circular shape or other shape based on the display characteristics of the display device 40.

The foregoing description assumes that the positions of partial images within a frame image are determined on the basis of the point of interest, which is gazed by the user. Therefore, when the gaze direction of the user changes, the positions of the partial images within the overall image also change accordingly. However, the present embodiment is not limited to such a configuration. The point of interest may alternatively be a fixed point such as the center of the display region. In such a case, the point-of-interest identification section 51 is not required.

The foregoing description assumes that the unsynthesized images to be synthesized to obtain one frame image include two different partial images. Alternatively, however, one partial image or three or more partial images may be included. In any case, the amount of data to be transmitted can be reduced by determining the resolution and size of each partial image in such a manner that the higher the resolution of a partial image, the smaller the corresponding region within a frame image.

The foregoing description assumes that a synthesis process is performed after three unsynthesized images are completely received. Alternatively, however, the processing unit 41 may perform the synthesis process on a received portion of the unsynthesized images while the communication interface 42 is receiving the unsynthesized images. In this case, at a time when leading portions of the unsynthesized images are stored in the buffer memory 43, the processing unit 41 acquires and synthesizes the stored portions, and supplies the resulting portions to the video display element 44 as a video signal. Upon receiving the subsequent portions of the unsynthesized images, the communication interface 42 overwrites portions processed by the processing unit 41 with the received subsequent portions and stores the resulting portions. When such parallel processing is performed, it is necessary that the buffer memory 43 have only a capacity sufficient for storing certain portions of the unsynthesized images. That is to say, the buffer memory 43 does not require a capacity for storing the whole data on all the unsynthesized images.

When the above-described parallel processing is to be implemented, it is preferable that the image data transmission section 53 divide each unsynthesized image into a plurality of transmission units (hereinafter referred to as the blocks) and transmit image data on an individual block basis. Here, it is assumed as a concrete example that the processing unit 41 gradually generates a frame image, starting with the highest upper side line and working sequentially towards the lowest lower side line, by regarding each of laterally arranged pixel rows (lines) within a frame image as a unit of processing. If, in this instance, the point of interest is at or below the center of the display region, the highest line of the frame image is generated on the basis of the overall image P0 as illustrated in FIG. 7 so that the data on the first partial image P1 and the second partial image P2 are not used immediately after the start of frame image generation. Subsequently, when the lines at position coordinates Y2 and beyond are to be generated, the data on the overall image P0 and the first partial image P1 are used, and when the lines at position coordinates Y1 and beyond are to be generated, the data on all the unsynthesized images are required. Therefore, the image data transmission section 53 divides each of the unsynthesized images into a plurality of blocks and transmits the individual blocks in the order required for frame image synthesis processing. In this instance, each block may correspond to one or more lines of laterally arranged pixel rows within each synthesized image. The image data transmission section 53 sequentially transmits the blocks of each partial image to the display device 40. More specifically, for example, the image data transmission section 53 first transmits blocks forming the highest portion of the overall image P0 (the blocks corresponding to position coordinates Y3 to Y2), then transmits blocks of the overall image P0 and first partial image P1, which correspond to position coordinates Y2 to Y1, and subsequently transmits blocks of each unsynthesized image corresponding to position coordinates Y1 and beyond. In this manner, the display device 40 is able to start generating and displaying a frame image starting with the upper portion while receiving the data on the partial images.

Figure 9:
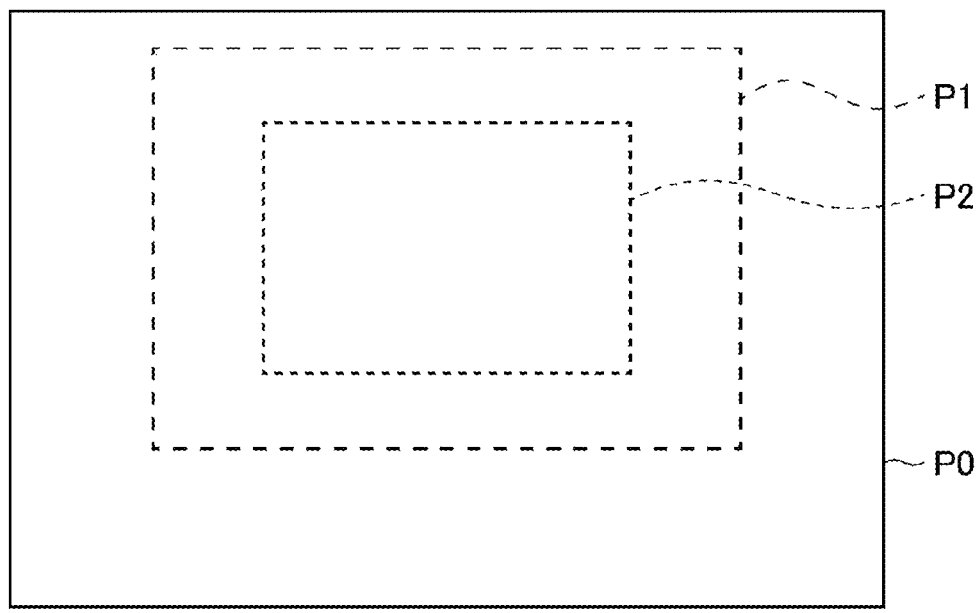
FIG. 9 is a diagram illustrating an exemplary positional relationship between unsynthesized images within a frame image.

Further, it is preferable in the above instance that the image data transmission section 53 change the order of individual block transmissions in accordance with a change in the point of interest. When, as a concrete example, the point of interest moves upward from the center, the positions of the first partial image P1 and second partial image P2 relative to the overall image P0 also move upward. FIG. 9 illustrates an example of a frame image that is obtained in the above case by synthesizing three different unsynthesized images. When the point of interest moves upward as described above, the upper blocks of the first and second partial images P1 and P2 are required immediately after the start of frame image generation as compared with a time point before such a move. Therefore, when the point of interest moves upward, these blocks are preferentially transmitted. Exercising control as described above makes it possible to generate a frame image without delay.

If a plurality of different unsynthesized images are required to generate one line within a frame image, a low-resolution unsynthesized image may be preferentially transmitted. If, for example, a portion between position coordinates Y2 to Y1 in the example of FIG. 7 is to be subjected to synthesis, corresponding blocks of the overall image P0 and first partial image P1 are basically required. However, the corresponding block of the overall image P0 is preferentially transmitted, and then the block of the first partial image P1 that corresponds to the same position is transmitted. Consequently, when the corresponding block of the first partial image P1 is not transmitted in time due, for instance, to communication delay, using the overall image P0 makes it possible to generate and display a frame image even if it is low in resolution.

The foregoing description assumes that the image generation section 52 itself draws unsynthesized images depicting a three-dimensional space. Alternatively, however, the image generation section 52 is not limited to the above-described type, and may generate unsynthesized images on the basis of a prepared high-resolution image. If, for example, video data is available that includes a frame image having the same resolution as the frame image to be displayed on the display device 40, the image generation section 52 generates an image having a considerably lower overall resolution than the available frame image as the overall image P0. Further, an image obtained by slightly lowering the resolution by clipping a predetermined region of this frame image is handled as the first partial image P1, and an image obtained by clipping a smaller predetermined region than for the first partial image P1 is handled as the second partial image P2 having the unchanged resolution. The image data transmission section 53 transmits each unsynthesized image generated in the above manner to the display device 40. Consequently, even when high-resolution video is to be reproduced, it is possible to reduce the amount of image data to be transmitted from the image processing device 10 to the display device 40.

The foregoing description assumes that the relay device 30 is wirelessly communicatively connected to the display device 40. However, the embodiment of the present invention is not limited to such a configuration. Alternatively, the image processing device 10 may be connected to the display device 40 via various communication links. Further, the relay device 30 is not always required. The image processing device 10 may be directly connected to the display device 40.

REFERENCE SIGNS LIST

1 Video display system
10 Image processing device
11 Control section
12 Storage section
13 Interface section
30 Relay device
40 Display device
41 Processing unit
42 Communication interface
43 Buffer memory
44 Video display element
45 Optical element
51 Point-of-interest identification section
52 Image generation section
53 Image data transmission section
54 Timing control section
55 Image data selection section
56 Display control section

The invention claimed is:

1. An image processing device that supplies video to a display device mounted on the head of a user, the image processing device comprising:
an image generation section operating to generate a plurality of unsynthesized images having different resolutions, the unsynthesized images being to be synthesized to obtain a display image to be displayed on the display device; and
a transmission section operating to transmit each of the unsynthesized images to the display device; and
a point-of-interest identification section operating to identify a point of interest, the point of interest being within a display region of the display device and gazed by the user, wherein:
the unsynthesized images include a partial image that corresponds to a partial region within the display image,
the transmission section transmits to the display device the partial image and additional information that identifies the corresponding position of the partial image within the display image,
a display image is generated by synthesizing the unsynthesized images in such a manner that the partial image corresponds to the position identified by the additional information,
the image generation section generates the partial image in such a manner that the partial image corresponds to a position within the display image that is determined on the basis of the point of interest, and
the transmission section divides each of the unsynthesized images into a plurality of units of transmission, transmits the images by each unit of transmission to the display device, and changes the order of transmission of the units of transmission in accordance with the point of interest, the units of transmission forming each of the unsynthesized images.

2. The image processing device of claim 1, wherein the image generation section operates to generate the plurality of unsynthesized images having different size dimensions ranging from largest to smallest, and different resolutions ranging from highest to lowest, that are to be used for display by the display device.

3. The image processing device of claim 2, wherein
a frame image is displayed by the display device that is obtained by synthesizing the unsynthesized images;
the frame image includes at least a portion of each unsynthesized image, and the portions of lower resolution than the highest resolution are magnified and boundaries between the portions are indistinct; and
a total amount of data in the unsynthesized images is less than a total amount of data in an image obtained by drawing the largest unsynthesized image at the resolution of the smallest unsynthesized image.

4. An image processing method, comprising:
supplying video to a display device mounted on the head of a user;
generating a plurality of unsynthesized images having different resolutions that are to be synthesized to obtain a display image to be displayed on the display device, where the unsynthesized images include a partial image that corresponds to a partial region within the display image;
transmitting each of the unsynthesized images to the display device, including transmitting to the display device the partial image and additional information that identifies the corresponding position of the partial image within the display image;
generating a display image by synthesizing the unsynthesized images in such a manner that the partial image corresponds to the position identified by the additional information;
operating to identify a point of interest, the point of interest being within a display region of the display device and gazed by the user;
generating the partial image in such a manner that the partial image corresponds to a position within the display image that is determined on the basis of the point of interest;
dividing each of the unsynthesized images into a plurality of units of transmission;
transmitting the images by each unit of transmission to the display device; and
changing the order of transmission of the units of transmission in accordance with the point of interest, the units of transmission forming each of the unsynthesized images.

5. The method of claim 4, wherein the generating includes generating the plurality of unsynthesized images having different size dimensions ranging from largest to smallest, and different resolutions ranging from highest to lowest, that are to be used for display by the display device.

6. The method of claim 5, wherein:
a frame image is displayed by the display device that is obtained by synthesizing the unsynthesized images;
the frame image includes at least a portion of each unsynthesized image, and the portions of lower resolution than the highest resolution are magnified and boundaries between the portions are indistinct; and
a total amount of data in the unsynthesized images is less than a total amount of data in an image obtained by drawing the largest unsynthesized image at the resolution of the smallest unsynthesized image.

7. A non-transitory, computer readable storage medium containing a computer program, which when executed by a computer causes the computer to carry out an image processing method, comprising:
supplying video to a display device mounted on the head of a user;
generating a plurality of unsynthesized images having different resolutions that are to be synthesized to obtain a display image to be displayed on the display device, where the unsynthesized images include a partial image that corresponds to a partial region within the display image;
transmitting each of the unsynthesized images to the display device, including transmitting to the display device the partial image and additional information that identifies the corresponding position of the partial image within the display image;
generating a display image by synthesizing the unsynthesized images in such a manner that the partial image corresponds to the position identified by the additional information;
operating to identify a point of interest, the point of interest being within a display region of the display device and gazed by the user;
generating the partial image in such a manner that the partial image corresponds to a position within the display image that is determined on the basis of the point of interest;
dividing each of the unsynthesized images into a plurality of units of transmission;
transmitting the images by each unit of transmission to the display device; and
changing the order of transmission of the units of transmission in accordance with the point of interest, the units of transmission forming each of the unsynthesized images.

* * * * *